US012654180B2

(12) United States Patent
Pahl

(10) Patent No.: US 12,654,180 B2
(45) Date of Patent: Jun. 16, 2026

(54) NOZZLE ASSEMBLY FOR APPLYING FLUIDS, SYSTEM COMPRISING SUCH A NOZZLE ASSEMBLY, AND METHOD FOR APPLYING FLUIDS

(71) Applicant: Illinois Tool Works Inc., Glenview, IL (US)

(72) Inventor: Andreas Pahl, Erkrath (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 352 days.

(21) Appl. No.: 18/337,528

(22) Filed: Jun. 20, 2023

(65) Prior Publication Data

US 2024/0017277 A1 Jan. 18, 2024

(30) Foreign Application Priority Data

Jul. 14, 2022 (DE) ..................... 10 2022 117 652.5

(51) Int. Cl.
*B05B 1/04* (2006.01)
*B05B 1/10* (2006.01)
*B05B 1/26* (2006.01)

(52) U.S. Cl.
CPC ................ *B05B 1/044* (2013.01); *B05B 1/10* (2013.01); *B05B 1/26* (2013.01)

(58) Field of Classification Search
CPC .. B05B 1/044; B05B 1/10; B05B 1/26; B05B 7/08; B05B 7/0807; B05B 1/24; B05B 7/0815; B05B 7/0861; B05B 7/10
See application file for complete search history.

(56) References Cited

U.S. PATENT DOCUMENTS

| | | | | |
|---|---|---|---|---|
| 5,685,934 | A | 11/1997 | Ikeda et al. | |
| 7,934,465 | B1 | 5/2011 | Brinker | |
| 9,827,579 | B2 * | 11/2017 | Hidaka | B05C 5/025 |
| 9,850,870 | B2 * | 12/2017 | Mulye | F02M 67/02 |
| 2017/0065987 | A1 * | 3/2017 | Pahl | B05C 5/027 |

(Continued)

FOREIGN PATENT DOCUMENTS

| | | | |
|---|---|---|---|
| AU | 199942473 | B2 | 4/2000 |
| DE | 3523521 | A1 | 1/1986 |
| DE | 102016014270 | A1 | 5/2018 |

(Continued)

OTHER PUBLICATIONS

Examination Report mailed Mar. 6, 2023 for corresponding DE Patent Application No. 10 2022 117 652.5.

(Continued)

*Primary Examiner* — Steven M Cernoch
(74) *Attorney, Agent, or Firm* — Carroll, Hoette & Butscher, LLC; Christopher R. Carroll

(57) ABSTRACT

The invention relates to a nozzle arrangement for applying fluids, in particular thermoplastic materials, to a substrate. The nozzle arrangement comprises a base body, which can be connected, preferably exchangeably, to a mounting region of a distributor, and a front lateral surface. A recessing region is configured in the front lateral surface of the base body. At least one first outlet opening and preferably a plurality of adjacently arranged first outlet openings for the fluid to be applied to the substrate is configured in the recessing region of the front lateral surface of the base body.

9 Claims, 5 Drawing Sheets

(56) References Cited

U.S. PATENT DOCUMENTS

2021/0345748 A1* 11/2021 Samain .................... A45D 7/04

FOREIGN PATENT DOCUMENTS

| | | | |
|---|---|---|---|
| DE | 102019106146 | A1 | 9/2020 |
| DE | 102020131330 | A1 | 6/2022 |
| WO | 2006056409 | A2 | 6/2006 |
| WO | 2014136367 | A1 | 9/2014 |
| WO | 2020092490 | A2 | 5/2020 |

OTHER PUBLICATIONS

Extended European Search Report received in EP Application No. 23185543.8, mailed on Mar. 25, 2024.

* cited by examiner (Stand der Technik)

NOZZLE ASSEMBLY FOR APPLYING FLUIDS, SYSTEM COMPRISING SUCH A NOZZLE ASSEMBLY, AND METHOD FOR APPLYING FLUIDS

The invention relates in general to the application of fluids, including thermoplastic or fibrous adhesives, to a substrate by at least one nozzle arrangement preferably detachably fastened to a mounting surface of a distributor or distributor head, wherein the distributor or distributor head generally serves to supply the fluid to be applied to the substrate, to the at least one nozzle arrangement.

The purpose of such a system is the application of fluids to, for example, substrates moving relative to the at least one nozzle arrangement, and in particular the application of adhesives in partial spray patterns for the partial coverage of a substrate.

EP 0 872 580 A, by way of example, discloses a plurality of melt-blowing nozzle arrangements or nozzles which can be fastened side by side to one or both ends of a conventional distributor or distributor head, which provides a metered supply of adhesive to each nozzle arrangement. The nozzle arrangements each comprise a plurality of substantially parallel plate elements formed on an outlet surface. The row of fluid outlet openings of each nozzle arrangement forms a section of a longer row formed by the plurality of adjacent nozzle arrangements arranged along a common end of the distributor head. One or both sides of the distributor may be attached adjacent to the side of a similarly constructed distributor head to form even longer rows of fluid outlet openings, whereby a modular hot melt blow adhesive dispensing system is provided that accommodates substrates of any dimensional width.

In some adhesive-dispensing applications, it is desirable that the adhesive is applied to a substrate in such a manner that the adhesive covers as much of the full width of the substrate as possible. Such applications include, for example, the application of adhesives during the manufacture of vehicle interior trim parts, and in particular in the application of adhesives to the underside of a decorative layer or to a substrate to which a decorative layer is to be adhesively bonded. Typically, the adhesive is applied to the so-called "carrier part" (in particular a plastic injection-molded part) and then the part is placed in a device for press lamination. The adhesive can be reactivated by infrared light, and the carrier part can then be press-fitted with a decorative blank.

For such applications, it is, in particular, necessary for the adhesive to be applied as uniformly and homogeneously as possible, since under certain circumstances an irregular application of adhesive can have a negative effect on the visual appearance of the fitted decorative layer or on the haptics. In particular, a fine spray pattern without traces is desired during the application of the adhesive, wherein above all there must be no formation of droplets in the pattern.

For the sake of illustration, a conventional system 150 for applying thermoplastic adhesives 20 to a substrate 21 is shown schematically and in an isometric view in FIG. 1. The system 150 substantially comprises a distributor head 30, which is preferably connected or is connectable to an actuator (not shown in FIG. 1), such as a robot arm or the like, and which is movable along a direction of movement relative to the substrate 21.

A nozzle arrangement 101 is connected, preferably exchangeably, to the distributor head 30 in a mounting region of the distributor head 30. In this, the distributor head

30 serves to supply the nozzle arrangement 101, in a suitable manner, with the thermoplastic adhesive 20 to be sprayed and, possibly, with other fluids, such as forming air, etc.

The nozzle arrangement 101 used in the conventional system 150 for applying thermoplastic adhesives 20 to a substrate 21 is, for example, a so-called UFD™ nozzle arrangement of this applicant, with which a random application pattern can be applied to the substrate 21. Such a nozzle arrangement is described—at least in principle—in the aforementioned publication EP 0 872 580 A.

In brief summary, this refers to a nozzle arrangement 101 comprising a base body which—seen in top view—is configured at least substantially perpendicular, and which is connected or connectable to the mounting region of the distributor head 30.

The base body of the nozzle arrangement 101 comprises a front lateral surface 103, which corresponds to the outlet surface by means of which the thermoplastic adhesive 20 to be applied to the substrate 21 is dispensed.

In order to be able to apply the adhesive 20 to the substrate 21 in the most extensive manner possible, a plurality of outlet nozzles for the adhesive to be applied, arranged adjacent to one another, is formed in the front lateral surface 103 of the base body, which side surface extends in a direction perpendicular to the direction of movement of the distributor head 30. In order to be able to replicate a specific application pattern of the adhesive 20 on the substrate 21, the individual outlet nozzles for the adhesive 20 to be applied are assigned corresponding outlet nozzles for forming air.

For this purpose, it is, in particular, provided with the known nozzle arrangement 101 that, in the direction of extension of the front lateral surface 103 of the base body, there are adjacently and, in particular, alternately arranged, on the one hand, first outlet nozzles for the adhesive 20 to be applied and, on the other hand, second outlet nozzles for corresponding forming air (in particular pressurized air). The (second) outlet nozzles for forming air are configured to form a plurality of fluid streams of forming air which streams are aligned, in particular, in a converging manner with respect to the fluid streams of adhesive, which streams of adhesive are aligned by the first outlet nozzles for the adhesive to be applied to the substrate 21. The fluid stream of adhesive dispensed from each of the first outlet nozzles for the adhesive 20 can be deflected by varying the amount of forming or pressurized air dispensed per unit of time from the second outlet nozzles.

Although the distributor heads 30 or nozzle arrangements 101 known from the prior art are capable of applying the adhesive 20 to the substrate 21 in an extensive manner and with a specific application pattern, the nozzle arrangements 101 known from the prior art have certain limitations in their applications. This applies, in particular, to applications in which the adhesive is to be applied to the substrate 21 in the most extensive manner and, in particular, the adhesive is to be applied to the substrate 21 as uniformly as possible, as is desired, for example, when laminating decorative surfaces, in particular to interior trim parts for vehicles.

There is, in particular, a need for a nozzle arrangement with which the fluid to be applied can be sprayed at an angle without there being a need for a rotational movement of the distributor or distributor head 30, inasmuch as such a rotational movement is often not feasible due to the small distance provided between the nozzle arrangement and the substrate and the three-dimensional geometry of the substrate.

Furthermore, a corresponding optimized system for the application of fluids, in particular of thermoplastic adhesives, on substrates with a correspondingly complex geometry is to be specified.

Accordingly, the invention relates, in particular, to a nozzle arrangement for applying fluids, in particular thermoplastic materials, to a substrate. The nozzle arrangement comprises a base body with a front lateral surface that can be connected to a mounting region of a distributor, preferably in an exchangeable manner.

The nozzle arrangement is configured to be moved relative to the substrate in a first direction (=direction of movement). For example, the substrate can be moved relative to the fixed nozzle arrangement, or the nozzle arrangement can be moved relative to the fixed substrate.

The distributor or alternatively the distributor head can, for example, be attached to an actuator, such as a robot arm or the like, to move the nozzle arrangement relative to the substrate.

Preferably, the front lateral surface of the base body of the nozzle arrangement extends at least substantially in a second direction, which direction is at least substantially perpendicular to the first direction, which is to say, the (relative) direction of movement.

In order to be able to apply a fluid, in particular a thermoplastic adhesive, to a substrate having a correspondingly complex geometry and, in particular, to apply it to a substrate with edge folding regions by means of the nozzle arrangement, without there being a need, for this purpose, for a rotational movement of the distributor or alternatively of the distributor head while still maintaining as small a distance as possible between the nozzle arrangement and the substrate, it is, in particular, provided in accordance with the invention that a recessing region is formed in the front lateral surface of the base body, wherein at least one first outlet opening and preferably a plurality of side by side first outlet openings for the fluid to be applied to the substrate is/are formed in the recessing region of the front lateral surface of base body.

The advantages achievable with the solution according to the invention are obvious. Inasmuch as the first outlet openings for the fluid to be applied to the substrate are configured in the recessing region of the front lateral surface of the base body, it is simply and effectively achieved that no components, and in particular not the first outlet openings, protrude beyond the front lateral surface of the base body. In this way, a particularly compact design of the nozzle arrangement is achieved, wherein dedicated regions, in particular, in edge folding regions of the substrate, can also be treated with the aid of the nozzle arrangement and in particular with the aid of the first outlet openings without the need for a rotary movement of the distributor or alternatively distributor head.

In particular, it is provided according to the invention that the front lateral surface of base body of the nozzle arrangement extends in a direction which preferably is at least substantially perpendicular to the (relative) direction of movement of the nozzle arrangement or alternatively of the distributor or distribution head. It is provided that the at least one first outlet opening of the nozzle arrangement is formed in the recessing region of the front lateral surface of the base body in such a way that the fluid to be applied to the substrate is or can be discharged from the at least one first outlet opening in a direction that is oblique with respect to the direction in which the front lateral surface of the base body extends.

Pursuant to preferred implementations of the nozzle arrangement according to the invention, it is provided in this context that the recessing region has a wall region extending obliquely with respect to the direction of extension of front lateral surface of base body, which recessing region is connected via an edge region or arc region to a wall region of front lateral surface extending in the direction of extension of front lateral surface of base body. The at least one first outlet opening should be formed in the obliquely extending wall region of the recessing region.

In this context, it is particularly advantageous that the obliquely extending wall region of the recessing region does not protrude above a plane in which the front lateral surface and, in particular, the wall region of the front lateral surface extending in the direction of extension of the front lateral surface of the base body lies.

According to preferred implementations, an angle of between 35° and 75° and preferably an angle of between 45° and 55°, in particular an angle of about 50°, is provided between the obliquely extending wall region of the recessing region and the wall region of the front lateral surface extending in the direction of extension of the front lateral surface.

Pursuant to implementations of the nozzle arrangement according to the invention, it is provided that, in the recessing region, the obliquely extending wall region merges into a wall region extending at least substantially in the direction of extension of the front lateral surface.

In the same manner, it is also conceivable that, in the recessing region, the wall region extending at least substantially in the direction of extension of the front lateral surface of the base body merges into a second obliquely extending wall region of the recessing region.

Pursuant to preferred implementations of the nozzle arrangement according to the invention, it is provided that in the recessing region of the front lateral surface of the base body not only are first outlet openings formed for the fluid to be applied to the substrate, but also at least one second outlet opening and preferably a plurality of second outlet openings arranged side by side to one another are formed for a gas, in particular pressurized air.

In particular, it is provided in this context that a plurality of first outlet openings arranged side by side in a first row is formed in the recessing region of front lateral surface of base body, and that a plurality of second outlet openings arranged side by side in a second row running parallel to the first row is further formed in the recessing region of front lateral surface of base body.

The additional advantages that can be achieved with this embodiment are obvious: by dispensing with an alternating arrangement of first outlet openings for the fluid to be applied to the substrate and second outlet openings for forming air, and by arranging all outlet openings for the fluid or alternatively the adhesive, which is to say, all first outlet openings are arranged along one row and directly adjacent to one another, it is possible to accommodate a significantly higher number of first outlet openings for the adhesive to be applied in the recessing region while retaining the same dimensions of the nozzle arrangement.

It is moreover advantageous that a deflection or oscillation of the adhesive or filament jets dispensed by the first outlet openings predominantly only takes place in the direction of movement of the robot or alternatively of the nozzle arrangement. This reduces oscillation in the transverse direction of the nozzle arrangement and thereby prevents the merging of a plurality of adjacent filament jets, which is a known problem, in particular, in prior art nozzles with close spacing of the first outlet openings. For this purpose, the edge sharpness of the application is improved even further, inasmuch as transverse oscillation is always detrimental here and produces an imprecise edge.

With the nozzle arrangement according to the invention, it is nevertheless possible to deflect the adhesive fluid jets dispensed by the first outlet openings in a targeted manner, since a second row of outlet openings for a second fluid, in particular forming air or the like, is formed parallel to the first row of outlet openings.

By means of this parallel arrangement, on the one hand, of the first outlet openings for the adhesive to be applied, and on the other hand, of the second outlet openings for the forming air, it is possible to realize a significantly finer application pattern of the adhesive on the substrate, since—in contrast to the nozzle arrangements described above and known from the prior art—in particular, the second outlet openings also make it possible to deflect the adhesive fluid jets dispensed by the first outlet openings in the relative direction of movement of the nozzle arrangement.

In this manner, with the same dimensions of the nozzle arrangement, a particularly compact system can be provided which is capable of applying adhesive or another fluid in a particularly uniform manner and extensively on the substrate, something which is particularly desirable if a decorative layer is to be applied to a substrate with the aid of an adhesive layer.

In order to enable the fluid jets dispensed by the first outlet openings to be deflected as selectively as possible, it is, in particular, provided that for each first outlet opening at least one, and preferably exactly one, second outlet opening is provided, which second outlet is spaced apart from the first outlet opening.

In order to achieve the finest possible application pattern with the nozzle arrangement according to the invention of the adhesive on the substrate, it is provided in a preferred implementation of the nozzle arrangement according to the invention that a plurality of third outlet openings arranged adjacent to one another, in particular for forming air, is further configured in a third row in the recessing region of the front lateral surface of the base body, wherein the first row with the first outlet openings for the fluid to be applied to the substrate is arranged between the second and third rows with the second and third outlet openings.

In this further development of the nozzle arrangement according to the invention, it is also expedient that at least one and also preferably exactly one third outlet opening is provided for each first outlet opening.

Preferably, the nozzle arrangement is formed as a laminated nozzle unit consisting of a plurality of surface elements connected to one another in a planar manner. The advantage of forming the nozzle arrangement as a laminated nozzle unit is that even complex fluid channel systems can be configured inside the base body in a particularly precise yet relatively simple manner.

In other words, even complex fluid channels or alternatively fluid channel systems can be easily integrated into the nozzle arrangement. These fluid channels can be brought into fluid connection with correspondingly assigned fluid channels in the assembly region of the distributor head via a corresponding interface region.

All in all, the configuration of the nozzle arrangement according to the invention as a laminated nozzle unit thus enables a compact nozzle arrangement in which all necessary functionalities are integrated.

Alternatively, however, it is also conceivable to manufacture the nozzle arrangement according to the invention by means of 3D printing. In particular, a laser sintering or micro laser sintering process can be used here. By means of this manufacturing method, the fluid channels can be curved in several planes to achieve perfect flows. An assembly of nozzles is thereby dispensed with and thus any possible assembly error or tolerance deviation due to assembly is eliminated.

In a further development of the nozzle arrangement according to the invention, which is configured as a laminated nozzle assembly unit, it is provided that the nozzle arrangement comprises two outer clamping plates which are spaced apart from one another and between which a nozzle pack, which is preferably composed of a plurality of surface elements connected to one another in a planar manner, is interchangeably accommodated.

In this embodiment, it is conceivable that a simulator nozzle pack can be accommodated in place of the nozzle pack between the two outer clamping plates which are spaced apart from one another. The simulator nozzle pack may comprise a tailing region with at least one strip-like or filament-like region which extends in the direction in which, in the case of the nozzle pack, the fluid to be applied to the substrate is discharged from the first outlet openings.

Alternatively, however, it is also conceivable that the simulator nozzle pack is connected to the distributor head instead of the nozzle arrangement.

By providing such a simulator nozzle package, it is ensured in a manner that is simple to implement but still effective that a path of motion to be carried out by a robot for the nozzle arrangement is easily learned. At the same time, it is ensured that no collision occurs between the nozzle arrangement and the substrate, and that a predefined or definable distance between the nozzle arrangement and the substrate is maintained.

The invention further relates to a system for application of a fluid, in particular thermoplastic adhesives, to a substrate. The system comprises a distributor head, which is preferably connected or connectable to an actuator, in particular in the form of a robot arm, and which is movable along a direction of movement relative to the substrate. The system according to the invention further comprises a nozzle arrangement of the aforementioned type according to the invention, which is preferably interchangeably connected to the distributor head in a mounting region of the distributor head.

In particular, it is provided in this context that the at least one nozzle arrangement is arranged in the mounting region of the distributor head in such a way that the front lateral surface of the base body of the nozzle arrangement is aligned at least substantially perpendicular to the direction of movement of the distributor head.

With regard to the method according to the invention for applying fluids, and in particular thermoplastic adhesives, to a substrate, it is provided that a nozzle arrangement according to the invention of the kind described above is moved relative to the substrate in a direction of movement. Fluid jets, in particular thermoplastic adhesive jets, are then dispensed through the first outlet openings of the nozzle arrangement during the movement towards the substrate.

These fluid jets dispensed from the first outlet openings can, for example, be deflected from the main flow axis, in particular periodically, with the aid of forming air dispensed via second and/or third outlet openings, in order to generate, in particular, a random pattern of the fluid jet to be applied to the substrate.

Hereinafter, with reference to the accompanying drawings, an exemplary embodiment of the nozzle arrangement according to the invention is described in more detail.

Figure 2:
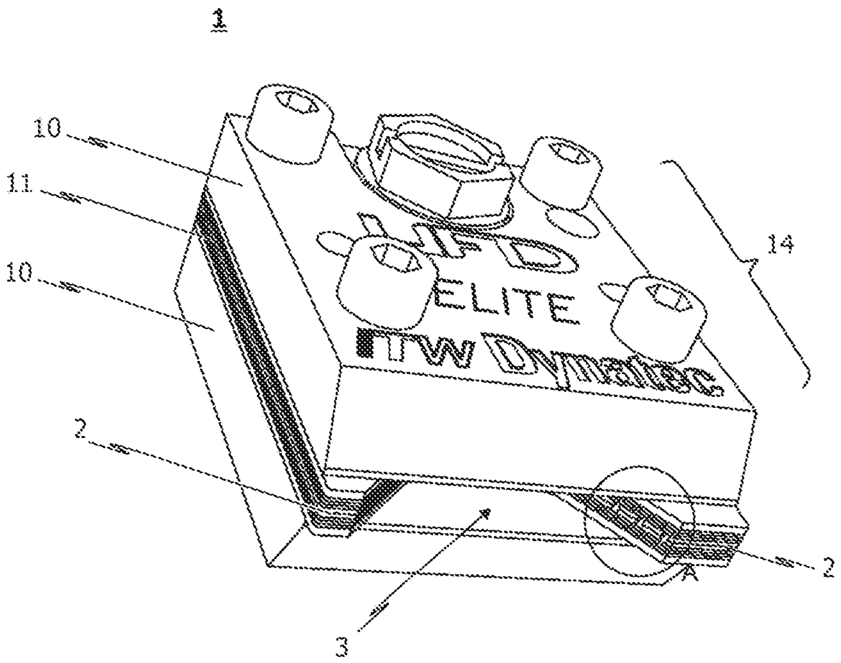
FIG. 2 shows schematically and in an isometric view, an exemplary embodiment of the nozzle arrangement according to the invention.
Figure 3:
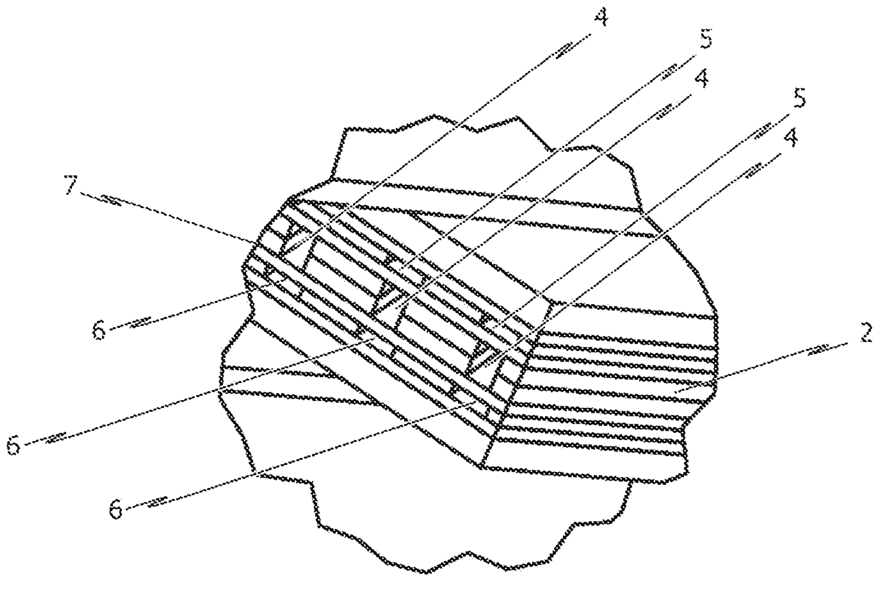
Figure 4:
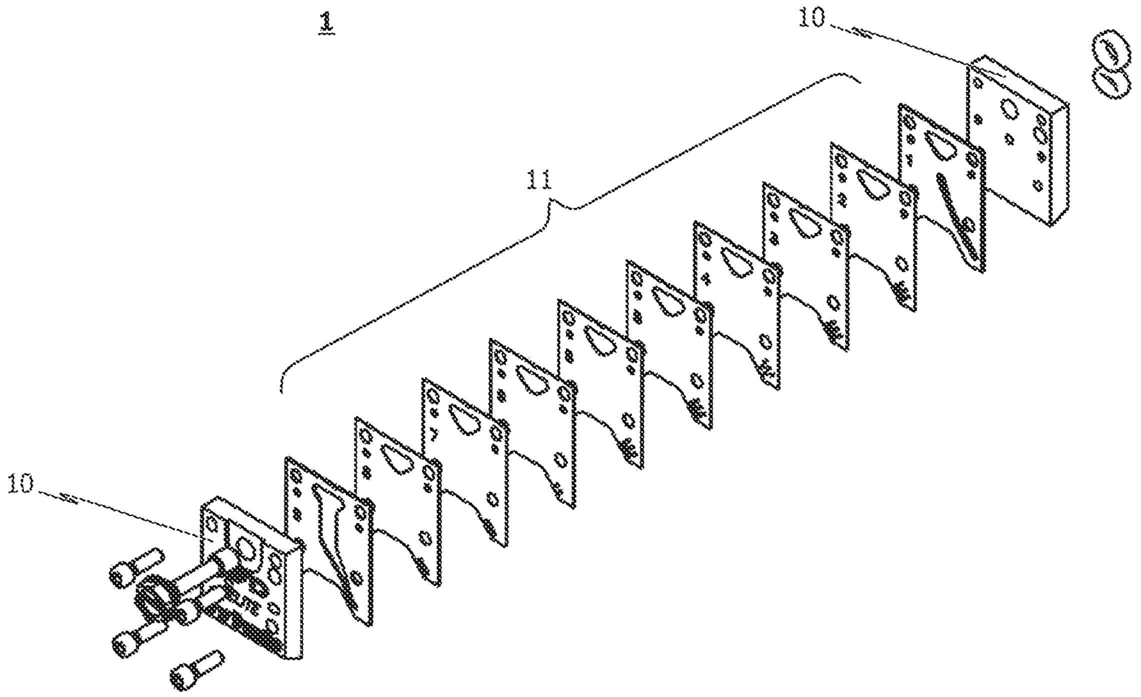
Figure 5:
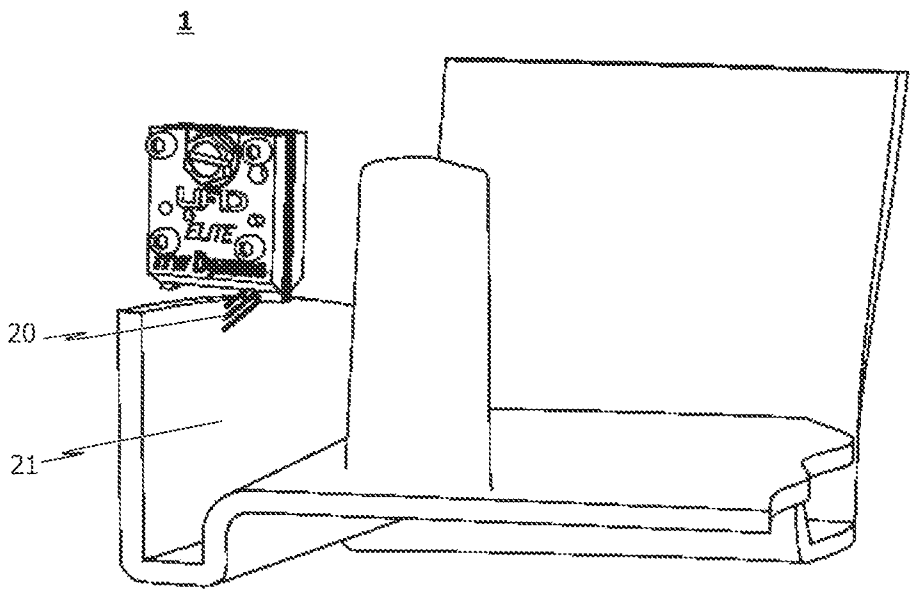
Figure 6:
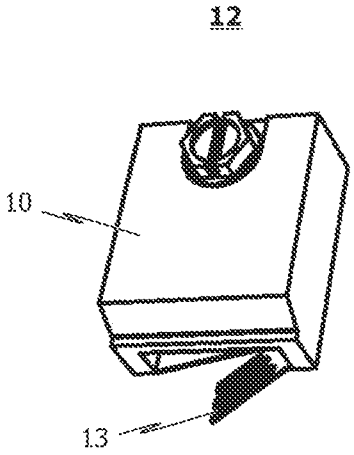
Figure 7:
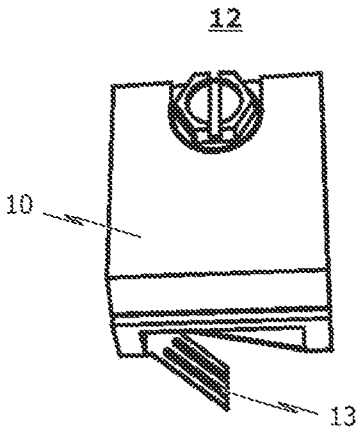

FIG. 3 schematically shows a detailed view of the recessing region formed in a front lateral surface of the base body of the exemplary embodiment of the nozzle arrangement according to the invention;

FIG. 4 schematically shows the exemplary embodiment of the nozzle arrangement according to the invention in an exploded view;

FIG. 5 shows schematically and in an isometric view, an embodiment of the system according to the invention for applying thermoplastic adhesives to a substrate with a nozzle arrangement according to FIG. 2;

FIG. 6 schematically shows a first exemplary embodiment of a simulation nozzle for simulating the spray pattern of the nozzle arrangement according to the invention; and FIG. 7 schematically shows a second exemplary embodiment of a simulation nozzle for simulating the spray pattern of the nozzle arrangement according to the invention.

It has long been recognized that thermoplastic adhesives form good binders. This is because they cure quickly, which is a particular advantage if the adhesive is applied step-by-step and the bond of the parts to be bonded then takes place immediately, and the bond obtained is very strong. Furthermore, the selection of components from which thermoplastic adhesives can be composed is so large that an appropriate adhesive composition can easily be produced for a given purpose.

Nevertheless, the widespread use of these adhesives has encountered certain difficulties in that the thermoplastic adhesive sometimes cannot be applied in an automated manner, or only with great difficulty, to specific selected regions of a substrate, in particular those with a complex geometry. This applies in particular to edge folding regions of substrates configured as molded bodies.

Figure 1:
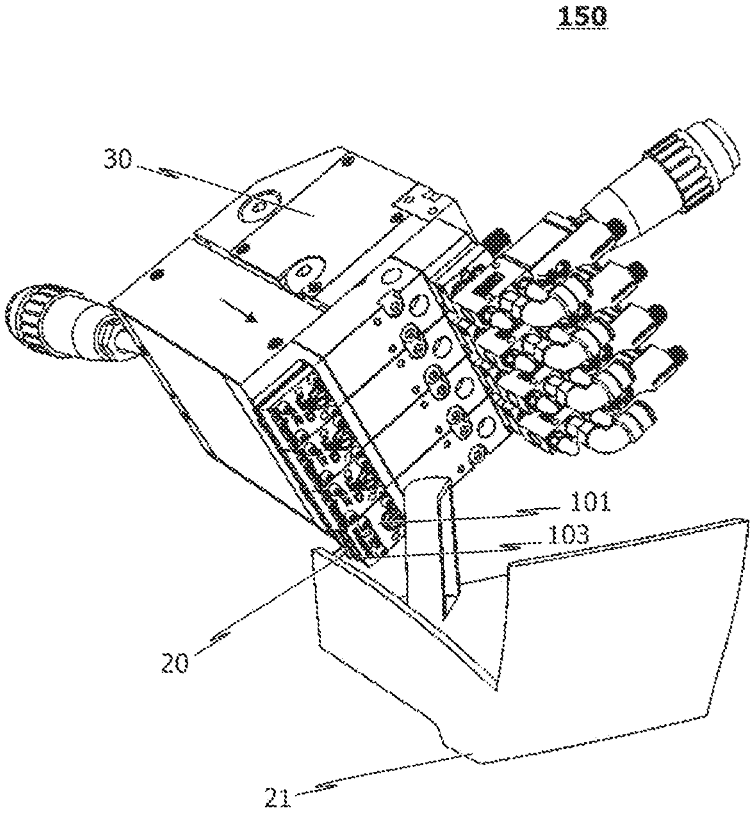
FIG. 1 shows schematically and in an isometric view, a conventional system for applying thermoplastic adhesives to a substrate.

A conventional system 150 is shown schematically and in an isometric view in FIG. 1, with which system a thermoplastic adhesive 20 is applied in an automated manner to specific regions of a substrate formed as a molded part. The conventional system 150 for applying thermoplastic adhesive 20 to a substrate 21 formed as a molded body comprises a distributor head 30, which is preferably connected or connectable to a robotic arm not shown in FIG. 1, and which is movable by means of the robotic arm along a direction of movement relative to the substrate 21.

As shown in FIG. 1, the conventional system 150 for applying thermoplastic adhesives further comprises a nozzle arrangement 101 which is preferably exchangeably connected to the distributor head 30 in a mounting region of the distributor head 30.

The nozzle arrangement 101 is substantially formed by an approximately rectangular base body, via which the nozzle arrangement 101 is connected to the mounting region of the distributor head 30. This substantially rectangular base body of the nozzle arrangement 101, as viewed in a top view, comprises a front lateral surface 103, in which at least one outlet nozzle is configured. The main flow axes defined by the outlet nozzle or alternatively the outlet opening of the outlet nozzle, along which the thermoplastic adhesive material 20 dispensed by the outlet nozzle moves, substantially enclose an at least right angle with the front lateral surface 103 of the base body of the nozzle arrangement 101.

Further, the front lateral surface 103 of the base body is oriented in the direction of movement of the distributor 30.

In applications of the conventional system 150 for molded bodies with complex geometric structures and, in particular, edge folding regions, it is generally unavoidable that either parts of the system, in particular the distributor head or the nozzle arrangement, come into contact with regions of the molded body or alternatively that not all necessary regions of the molded body can be reached with the nozzle arrangement.

To solve this problem, an optimized nozzle arrangement 1 is proposed in accordance with the invention, wherein an exemplary embodiment of said nozzle arrangement 1 is hereinafter described in more detail with reference to the illustrations in FIG. 2 to FIG. 7.

The nozzle arrangement 1 according to the invention, as shown by way of example in FIG. 2 to FIG. 7, comprises a base body 14 which can be connected, preferably in an exchangeable manner, to a mounting region of a distributor or distributor head.

By way of example, the base body 14 may comprise an at least substantially rectangular configuration with a front lateral surface. The front lateral surface of the base body 14 preferably extends in a direction which, during operation of the nozzle arrangement 1, which is to say, when the nozzle arrangement 1 is used to apply fluids to a substrate 21, runs substantially perpendicular to the direction in which the substrate 21 is moved relative to the nozzle arrangement 1.

The nozzle arrangement 1 according to the invention is characterized in particular in that a recessing region 3 is formed in the front lateral surface of the base body 14. As can, in particular, be seen from FIG. 2 and the detailed view in FIG. 3, a plurality of first outlet openings 4 for the fluid 20 to be applied to the substrate 21 are formed in the recessing region 3 of front lateral surface of the base body 14.

The front lateral surface of the base body 14 extends in a first direction, wherein the first outlet openings 4 are configured in the recessing region 3 of front lateral surface of the base body 14 in such a way that the fluid 20 to be applied to the substrate 21 can be dispensed or is dispensed from the first outlet openings 4 in an direction that extends obliquely with respect to the first direction.

In detail, and as can be inferred in particular from the detailed view in FIG. 3, the recessing region 3 comprises a wall region 7 extending obliquely with respect to the first direction, which wall region is connected via an edge or arc region to a wall region 2 of the front lateral surface extending in the first direction. The first outlet openings 4 are thereby formed in the oblique wall region 7 of the recessing region 3.

It should be emphasized in this context that the obliquely extending wall region 7 of the recessing region 3 does not protrude beyond a plane in which the end-face side surface and, in particular, the wall region 2 of front lateral surface extending in the first direction lies. In particular, in the exemplary embodiment of the nozzle arrangement 1 according to the invention shown in the drawings, it is provided that an angle of about 50° is established between the obliquely extending wall region 7 of the recessing region 3 and the wall region 2 of front lateral surface extending in the first direction.

It can be inferred from the exploded view in FIG. 4 that in the recessing region 3 the obliquely extending wall region 7 merges into a wall region extending at least substantially in the first direction. It can, moreover, be inferred from the exploded view shown in FIG. 4 that in the recessing region 3, the wall region extending at least substantially in the first direction merges into a second obliquely extending wall region 7 of the recessing region 3.

It can, in particular, be inferred from the detailed view in FIG. 3 that second outlet openings 5 for forming air are moreover formed in the recessing region 3 of front lateral surface of the base body 14. In detail, it is thereby provided that in the recessing region 3 of front lateral surface of the base body 14, a plurality of first outlet openings 4 arranged side by side in a first row is formed, and that in the recessing region 3 of front lateral surface of the base body 14, is formed a plurality of second outlet openings 5 arranged side by side in a second row running parallel to the first row.

In addition, it is provided in the embodiment shown in the drawings that a plurality of third outlet openings 6 for forming air, arranged side by side in a third row extending parallel to the first row, is moreover formed in the recessing region 3 of front lateral surface of the base body 14, wherein the first row with the first outlet openings 4 is arranged between the second and third rows with the second and third outlet openings 5, 6.

It can be inferred from the exploded view in FIG. 4 that the nozzle arrangement 1 is formed, in particular, as a laminated nozzle assembly, which consists of a plurality of surface elements connected to one another in a planar manner. In particular, in the exemplary embodiment of the nozzle arrangement 1 according to the invention, it is provided that the nozzle arrangement 1 comprises two outer clamping plates 10 which are spaced apart from one another and between which a nozzle assembly 11 is interchangeably accommodated, which nozzle assembly is preferably configured of a plurality of surface elements connected to one another in a planar manner.

To simulate the application of adhesive achievable with the nozzle arrangement according to the invention, instead of the nozzle arrangement 1 according to the invention, a simulation nozzle can also be used, as shown in FIG. 6 and FIG. 7.

The simulation nozzle 12 has a tailing region 13 with at least one strip-like or filament-like region which extends in the nozzle assembly 11 in the direction in which the fluid 20 to be applied to the substrate 21 is dispensed from the first outlet openings 4.

The simulation nozzle 12 and in particular the tailing region 13 of the simulation nozzle 12 is formed, in particular, from plastic, in particular from an elastic plastic.

The invention is not limited to the exemplary embodiment shown in the drawings, but rather results from a synopsis of all the features disclosed herein.

REFERENCE LIST

1 Nozzle arrangement
2 Front lateral surface/wall region of front lateral surface
3 Recessing region
4 First outlet opening
5 Second outlet opening
6 Third outlet opening
7 Obliquely extending wall region of the recessing region
10 Outer clamping plates
11 Nozzle package made up of surface elements connected to each other in a planar manner
12 Simulation nozzle
13 Tailing region
14 Base body
20 Thermoplastic adhesive
21 Substrate
30 Distributor head
101 Nozzle arrangement (prior art)
103 Front lateral surface of the base body (prior art)
150 System for the application of fluid (prior art)

The invention claimed is:

1. A nozzle arrangement for applying fluids to a substrate, the nozzle arrangement comprising:

a base body with a front lateral surface, the base body configured to be connected to a mounting region of a distributor, the base body including a recessing region configured in the front lateral surface of the base body, the recessing region including at least a first outlet opening in the front lateral surface of the base body for the fluid to be applied to the substrate;

wherein, in the recessing region of the front lateral surface of the base body, at least one second outlet opening is further configured for passage of a gas;

wherein, in the recessing region of the front lateral surface of the base body, a plurality of the first outlet openings is arranged adjacently in a first row, and wherein, in the recessing region of the front lateral surface of the base body, a plurality of the second outlet openings is arranged adjacently in a second row that is parallel to the first row;

wherein, in the recessing region of the front lateral surface of the base body, a plurality of third outlet openings for the gas is arranged adjacently in a third row that is parallel to the first row, wherein the first row with the first outlet openings is arranged between the second and third rows with the second and third outlet openings;

wherein the front lateral surface extends in a first direction, and wherein the at least the first outlet opening is configured in the recessing region of the front lateral surface of the base body such that the fluid to be applied to the substrate is discharged or dischargeable from the at least the first outlet opening in an oblique direction that extends obliquely with respect to the first direction; and wherein the recessing region comprises a first obliquely extending wall region extending obliquely with respect to the first direction, the first obliquely extending wall region connected via an edge or arc region to a first direction wall region extending in the first direction of the front lateral surface, wherein the at least the first outlet opening is positioned in the obliquely extending wall region of the recessing region.

2. The nozzle arrangement according to claim 1, wherein the first obliquely extending wall region of the recessing region does not project above a plane in which the front lateral surface lies.

3. The nozzle arrangement according to claim 1, wherein an angle between 350 and 750 is spanned between the first obliquely extending wall region of the recessing region and the first direction wall region of the front lateral surface extending in the first direction.

4. The nozzle arrangement according to claim 1, wherein the first obliquely extending wall region transitions in the recessing region into a third wall region substantially extending in the first direction.

5. The nozzle arrangement according to claim 4, wherein the third wall region extending at least substantially in the first direction transitions in the recessing region into a second obliquely extending wall region of the recessing region.

6. The nozzle arrangement according to claim 1, wherein each of the first outlet openings is associated with one or more of a second outlet opening or a third outlet opening spaced apart from the first outlet opening transversely to a longitudinal extension direction of the first row.

7. The nozzle arrangement according to claim 1, wherein a first effective surface of each of the first outlet openings is at least substantially a same size, and wherein each of the first outlet openings is larger than a second effective surface of one or more of the second outlet openings or the third outlet openings.

8. The nozzle arrangement according to claim 1, wherein the nozzle arrangement is configured as a laminated nozzle construction unit including a plurality of planarly connected surface elements.

9. The nozzle arrangement according to claim 8, wherein the nozzle arrangement comprises outer clamping plates spaced apart from one another and between which a nozzle package is exchangeably received.

* * * * *